United States Patent [19]
Pardikes

[11] 4,279,759
[45] Jul. 21, 1981

[54] SETTLING COLUMN FOR USE WITH SOLIDS MONITOR

[75] Inventor: Dennis G. Pardikes, Sauk Village, Ill.

[73] Assignee: Nalco Chemical Company, Oak Brook, Ill.

[21] Appl. No.: 139,863

[22] Filed: Apr. 14, 1980

Related U.S. Application Data

[63] Continuation of Ser. No. 15,582, Feb. 27, 1979, abandoned.

[51] Int. Cl.³ .............................................. C02F 1/52
[52] U.S. Cl. .................................. 210/709; 210/745; 210/96.1; 210/101
[58] Field of Search .................. 73/61 R, 61.4; 137/4, 137/89, 93; 23/230 A; 210/42 R, 54, 96.1, 101, 198 R, 702, 709, 729, 745

[56] References Cited
U.S. PATENT DOCUMENTS

| | | | |
|---|---|---|---|
| 3,441,956 | 4/1969 | Farnham | 73/61 R |
| 3,462,364 | 8/1969 | Carlson | 210/42 R |
| 3,480,761 | 11/1969 | Kolodny et al. | 210/54 |
| 3,666,419 | 5/1972 | Cahoor et al. | 210/42 R |
| 3,869,903 | 3/1975 | Beach et al. | 73/61.4 |

Primary Examiner—Peter A. Hruskoci
Attorney, Agent, or Firm—Kinzer, Plyer, Dorn & McEachran

[57] ABSTRACT

A method and apparatus for controlling the feed rate of water treatment chemicals to a process stream requiring such treatment. A sample stream is obtained from the dynamic process stream at a controlled and constant rate and is fed to a settling column. The settling column is equipped with underflow and overflow weirs and a sensor between the weirs for monitoring the concentration of solids. The settling column provides a quiescent area in which solids and/or other particulate matter to be settled can demonstrate their relative tendency to do so. A controller responsive to the sensor governs the feed rate of a particular treatment chemical.

5 Claims, 1 Drawing Figure

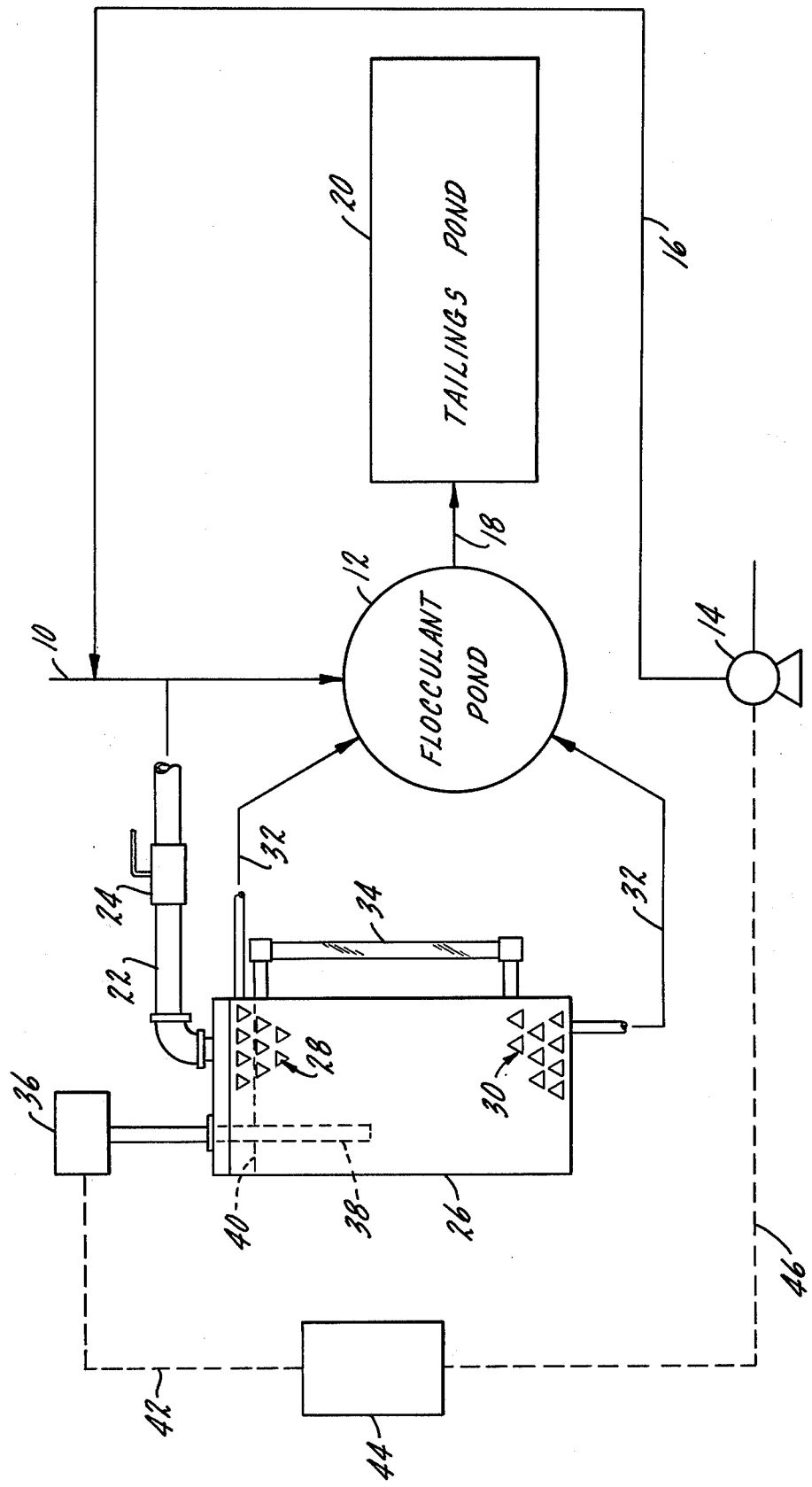

SETTLING COLUMN FOR USE WITH SOLIDS MONITOR

This is a continuation, of application Ser. No. 015,582, filed Feb. 27, 1979 now abandoned.

BACKGROUND OF THE INVENTION

This invention relates to water treatment facilities and in particular to treatment of a stream of water containing suspended solids in which the solids are coagulated by a flocculant to encourage settling. The invention is directed to optimization of flocculant feed rates for varying process stream conditions.

Industrial waste water treatment facilities are frequently required to handle influent streams having varying characteristics. When this is the case, it is necessary to enable the treatment system to react to the change in the influent process stream. For example, in mining operations, waste water from different mine shafts can have different characteristics as to type and amount of suspended solids. The problem then is one of compensation for changes due to changing mine shafts and the resulting change of the water characteristics.

The invention is particularly applicable to water suspensions containing mineral values. In a typical situation, the influent stream containing the suspended particles is delivered to a flocculant pond where a flocculant, such as a water-soluble polyelectrolyte, is added in an amount specific to the stream coming from a particular mine shaft. The amount of flocculant is that which produces the desired settling rate. When the process stream is from a different mine shaft, invariably the concentration and chemical makeup of suspended solids is different, requiring a different feed rate for the flocculant to achieve maximum settling efficiency. In the past, compensation in the amount of flocculant feed has been by visual observation or by placing solids monitors directly in the tailings pond. The former obviously is little more than a guess at the proper feed rate, while the latter method is undesirable because the monitors are exposed to variations in eddy currents, mixing currents and other types of phenomena that affect the solids level being monitored at a single point. This type of measurement has been found to be inadequate from a total control point of view.

SUMMARY OF THE INVENTION

This invention is a method and apparatus of controlling the addition or feed rate of water treatment chemicals to a normally flowing process stream containing suspended particulate matter. A portion of the process stream is diverted to provide a side stream which is transported to a settling column. The settling column has overflow and underflow weirs dimensioned to match the constant flow entering the settling column from the process stream. The settling column also has a sensor which extends into the water within the settling column. The sensor monitors the level of solids or other particulate matter in the side stream, and generates a signal proportional to the concentration of such particulate matter. This signal is fed to a controller which in turn governs the rate at which a feed system injects water treatment chemicals into the main process stream.

A primary object of the present invention is to improve response of a water treatment system to a change in the influent water characteristics.

Another object is to enable a water treatment system to compensate for varying influent conditions on a scientific basis.

Another object is to automatically optimize the use of treatment chemicals in a water treatment system.

Another object is to eliminate guesswork in the addition of treatment chemicals intended to alter the settling rate of entrained solids in a water system.

Another object is a water treatment system which detects the need for changes in its own operation.

DETAILED DESCRIPTION OF THE INVENTION

A schematic showing of the water treatment system of the present invention is shown in the accompanying drawing. In this figure, a normally flowing process stream is fed through fluid pipeline 10 to a flocculant pond 12. The process stream is mixed with a flocculant which is injected by pump 14 through a feed line 16. In a typical mining operation, the flocculant pond may be on the order of 30 feet in diameter. The water in this pond is in a turbulent condition and no settling takes place there. After mixing with the flocculant, the water flows through a pipe 18 to the tailings pond 20. The tailings pond may typically cover an area of approximately 20 acres and it is here that the settling takes place. Any mineral values contained in the solids may be recovered from the bottom of the tailings pond.

In some applications, it may be necessary to inject the flocculant directly into the pond 12 rather than into the process stream. This is due to flocculant breakdown that may occur under some conditions. Where possible, however, it is preferred to use the feed-forward arrangement shown in the drawing, although the invention will accommodate the alternate flocculant feed scheme.

The overall object of the present invention is to achieve an acceptable settling rate in the tailings pond. The settling rate is proportional to the solids concentration in the process steam and the concentration of the flocculant. The flocculant concentration can be controlled by controlling the speed of the injection pump 14, so the only independent variable is the solids characteristic. Thus, the overall settling rate can be controlled if the solids concentration of the incoming process stream is known. The solids concentration cannot be controlled but if it is known, it can be compensated for by varying the rate of the flocculant feed from injection pump 14. Since the process stream in line 10 and the flocculant pond 12 are both normally in a turbulent condition, the solids concentration cannot be easily determined in either of those locations. Accordingly, provision is made in accordance with the invention to provide for a side stream to be taken through slipstream line 22. This line may be provided with a suitable control valve 24. The side stream is fed to a settling chamber 26.

The settling chamber 26 is equipped with overflow weirs, indicated generally at 28, and underflow weirs indicated at 30. The overflow and underflow weirs are connected back to the flocculant pond 12 through return lines 32. A sight glass 34 may also be provided to indicate the liquid level in the settling chamber 26.

A sensor or monitor 36 is mounted on the settling chamber 26 with a probe portion 38 extending below the process level 40. The probe 38 is an optical device having a light source which shines through a water sample to a photocell. The sensor operates on either a light scatter or light transmittance principle to measure the concentration of suspended solids. Preferably, the sensor is of the self-cleaning type suitable to withstand the harshness of water treatment environments without signal loss or the need for frequent cleaning. Sensors manufactured by Monitor Technology, Inc. of Redwood City, Calif. have been found acceptable.

The signal developed by the sensor 36 is supplied through electric line 42 to a controller 44. The controller in turn governs the speed of operation of the injection pump 14, through line 46. The injection pump then acts as a metering device for supplying flocculant to the process stream 10 or to the pond 12 at varying rates.

The settling column 26 provides a quiescent area in which the solid particles to be settled can demonstrate their relative tendency to do so. The overflow weirs 48 and underflow wiers 30 are sized to permit a return flow rate through the lines 32 which matches the influent rate through the line 22. Thus, the flow in the settling column remains constant, as it is a function of the overflow and underflow weir sizes. This constant flow allows the solids monitor, when located in the settling column, to measure actual settling rate. The solids particles remaining in the middle of the column will exhibit changing downward velocities directly attributable to the flocculant state and particle size, thus, exhibiting a rate of settlement. The solids monitor reference point or sampling chamber will sense the solids concentration, which is proportional to the settling rate. The statistically accurate sample will be representative of the chemical's effectiveness in flocculating the suspended solids.

This measurement is used by controller 44 to dictate the feed rate of the pump 14. If the concentration of solids and/or chemical makeup measured by the sensor 36 increases and/or changes when the process stream is changed from one mine shaft to another, a signal is generated which demands that the pump 14 increase its output, thus increasing the amount of polyelectrolyte used to treat the solids in the altered process stream. This will affect the rate of settling and correct the imbalance between the amount of particulate matter in the stream and the rate of flocculant feed. On the other hand, if the solids concentration and/or chemical makeup in the adjacent mine shaft process stream decreases, and/or changes, the amount of polyelectrolyte used can also be decreased without loss of an acceptable settling rate. The controller 44 will respond to a decreased solids concentration to slow the rate of flocculant feed.

One of the advantages of the present invention is that it allows a constant side stream to be taken so that changes in the process stream characteristics can be quickly detected. The flocculant feed rate will likewise be quickly adjusted to compensate for the change. Obviously, the controller 44 will contain appropriate circuitry to convert the parts per million reading obtained from the sensor 36 to the proper pump speed which will obtain the desired feed rate.

While the invention has been described from the standpoint of recovery of mineral values, the invention can be practiced equally well in terms of any slurry system where a chamber containing solids suspended in water is treated by a flocculant to aid settling and in which the suspension fed to that chamber may have a concentration of solids which varies from time to time, including paper pulp systems, sewage treatment and other slurries.

I claim:

1. A method of controlling the addition rate of a water treatment chemical which induces settling to a normally-flowing process stream containing suspended solids requiring such treatment which comprises the steps of:
    (a) diverting a portion of the flowing process stream prior to the process stream entering a receiving chamber to provide a side stream sample, said sample containing both solids to be settled and the treatment chemical;
    (b) transporting the side stream sample to the top of a settling column while providing a quiescent area therein, said column being equipped with an overflow weir and underflow weir dimensioned to match the side stream flow entering the settling column from the process stream and also having a suspended matter monitor located below the normal liquid level and within said quiescent area in said settling column;
    (c) obtaining a readout signal from the suspended matter monitor, which signal indicates a measure of the suspended matter contained within said settling column;
    (d) transmitting said signal to said chemical feed system which feeds a water treatment chemical in response to said readout signal.

2. The method of claim 1 in which the chemical is a flocculant for settling the solids.

3. The method of claim 2 in which the process stream is derived from a mine shaft and in which there is a second mine shaft as a source of a second process stream having different solids characteristics compared to the first process stream.

4. A system for controlling the addition rate of water treatment chemicals which induce settling to a normally-flowing process stream containing suspended solids requiring such treatment, comprising:
    means for metering a supply of treatment chemical into said process stream, means for introducing said process stream into a receiving chamber, means for diverting a side stream from said process stream prior to the process stream entering the receiving chamber
    a settling column which provides a quiescent area therein said settling column including an inlet at the top thereof for introducing said side stream containing solids to be settled and treatment chemicals,
    said settling column including an overflow weir for passing the supernatant liquid and an underflow weir for passing the heavier effluent, wherein the overflow and underflow weirs are dimensioned such that flow rates into and out of the settling column are equal,
    a sensor between the weirs and within the quiescent area of the settling column for measuring settling rate, and
    a controller for said metering means, the controller being responsive to said sensor for increasing or decreasing the treatment chemical feed rate.

5. The system of claim 4 further comprising a sight glass mounted on the settling column so that the liquid level in the settling column can be ascertained.

* * * * *